(12) United States Patent
Scott

(10) Patent No.: US 7,775,568 B2
(45) Date of Patent: Aug. 17, 2010

(54) ANIMAL URINE SPECIMEN COLLECTOR

(76) Inventor: Gwen F. Scott, 704 C. Ave., West Columbia, SC (US) 29169

( * ) Notice: Subject to any disclaimer, the term of this patent is extended or adjusted under 35 U.S.C. 154(b) by 128 days.

(21) Appl. No.: 11/866,444

(22) Filed: Oct. 3, 2007

(65) Prior Publication Data
US 2009/0090309 A1    Apr. 9, 2009

(51) Int. Cl.
  A01K 29/00    (2006.01)
(52) U.S. Cl. .................................... 294/1.5; 119/161
(58) Field of Classification Search ............... 294/1.3, 294/1.4, 1.5, 2, 55; 30/324, 327; 119/161; 362/119, 120, 154
See application file for complete search history.

(56) References Cited
U.S. PATENT DOCUMENTS

| D156,850 S | * | 1/1950 | Shirley | D10/46.3 |
| 2,592,192 A | * | 4/1952 | Sanford | 30/326 |
| 3,510,643 A | * | 5/1970 | File | 362/26 |
| 3,744,453 A | * | 7/1973 | Deitch | 294/1.5 |
| 4,555,132 A | * | 11/1985 | Takoushian | 294/1.5 |
| 5,023,761 A | * | 6/1991 | de Lange | 362/120 |
| 5,964,517 A | * | 10/1999 | Adams | 362/119 |
| 6,039,370 A | * | 3/2000 | Dooley et al. | 294/1.5 |
| 6,602,231 B1 | * | 8/2003 | Mariea | 604/317 |
| 7,128,352 B1 | * | 10/2006 | Phippen | 294/1.5 |
| 7,311,411 B2 | * | 12/2007 | VanderSchuit | 362/84 |

* cited by examiner

Primary Examiner—Dean J Kramer
(74) Attorney, Agent, or Firm—Calhoun Thomas, III; Samuel Alexander Long, Jr.

(57) ABSTRACT

The invention is a device that facilitates the collection of urine and other such specimens from animals for the purpose of testing. It features a pod for collecting and holding the waste, a handle for manipulating the pod during testing, a base for resting the pod while testing is being performed, and a light source for illumination of the animal's waste emitting regions as well as the collection pod during the testing.

2 Claims, 4 Drawing Sheets

ANIMAL URINE SPECIMEN COLLECTOR

RELATED APPLICATIONS

Not applicable.

FEDERALLY SPONSORED RESEARCH OR DEVELOPMENT

Not applicable.

REFERENCE OR INCORPORATED MATERIAL

Not applicable.

FIELD OF THE INVENTION

The present invention relates to the field of animal care and specifically to the collection of urine specimens for testing and analysis.

SUMMARY OF THE INVENTION

The present invention is primarily designed as a tool to be used in the collection of urine or other specimens from animals for immediate testing. Many different tests may be conducted on the collected urine including various tests for diabetic animals. The device features a collection pod for receiving and temporarily containing the urine so that testing may commence. The device also features an elongated handle for the collector to manipulate during the testing as well as a directed illumination spot lamp which optionally focuses on the animal's waste emitting regions. A further feature exists in the balance of the design so that the pod may be stably rested on a flat surface such as the bottom of a sink or a countertop. This may prevent the collection from spilling. In the preferred embodiment, the collection device is balanced so as to rest unassisted. In alternate embodiments, however, where the device does not rest on its own, the device may be made to stably rest where the elongated handle rests on the rim of a sink which may prevent the collection from spilling.

In the typical use, a pet owner, animal care provider, or veterinarian will identify an animal requiring urinary testing. As the animal prepares to urinate, the user will grasp the urine collector by the elongated handle and operate the spot lamp. The user will then manipulate the device by locating the collection pod to the appropriate region beneath the animal, which has been illuminated by the spot lamp, in order to intercept the urine stream. When the user visualizes that enough urine has been collected, the user will then retract the pod from beneath the animal and rest the device on a flat surface. While the device is resting and still containing the specimen, the user will conduct the test. In the case of diabetic testing, the user will insert test strips into the sample which is contained within the pod. After testing, the urine is disposed of and the device is washed to be prepared for the next urine catch and test. Depending on the available light, the spot lamp may continue to be used to facilitate the viewing of the sample and the testing activity.

DETAILED DESCRIPTION

Figure 1:
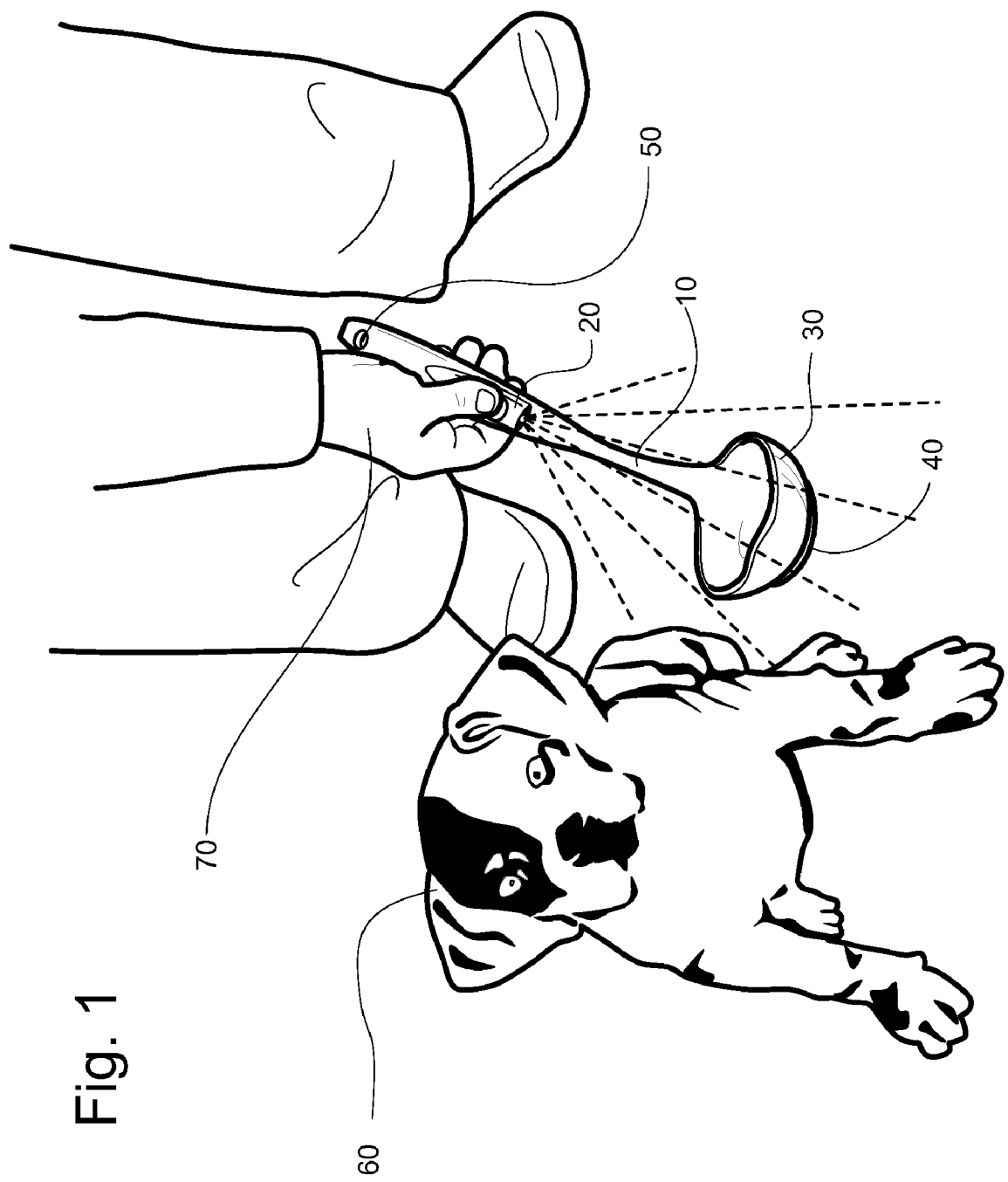
FIG. 1 is a perspective view showing how the device might be used and highlighting the illumination provided to the collection pod.
Figure 2:
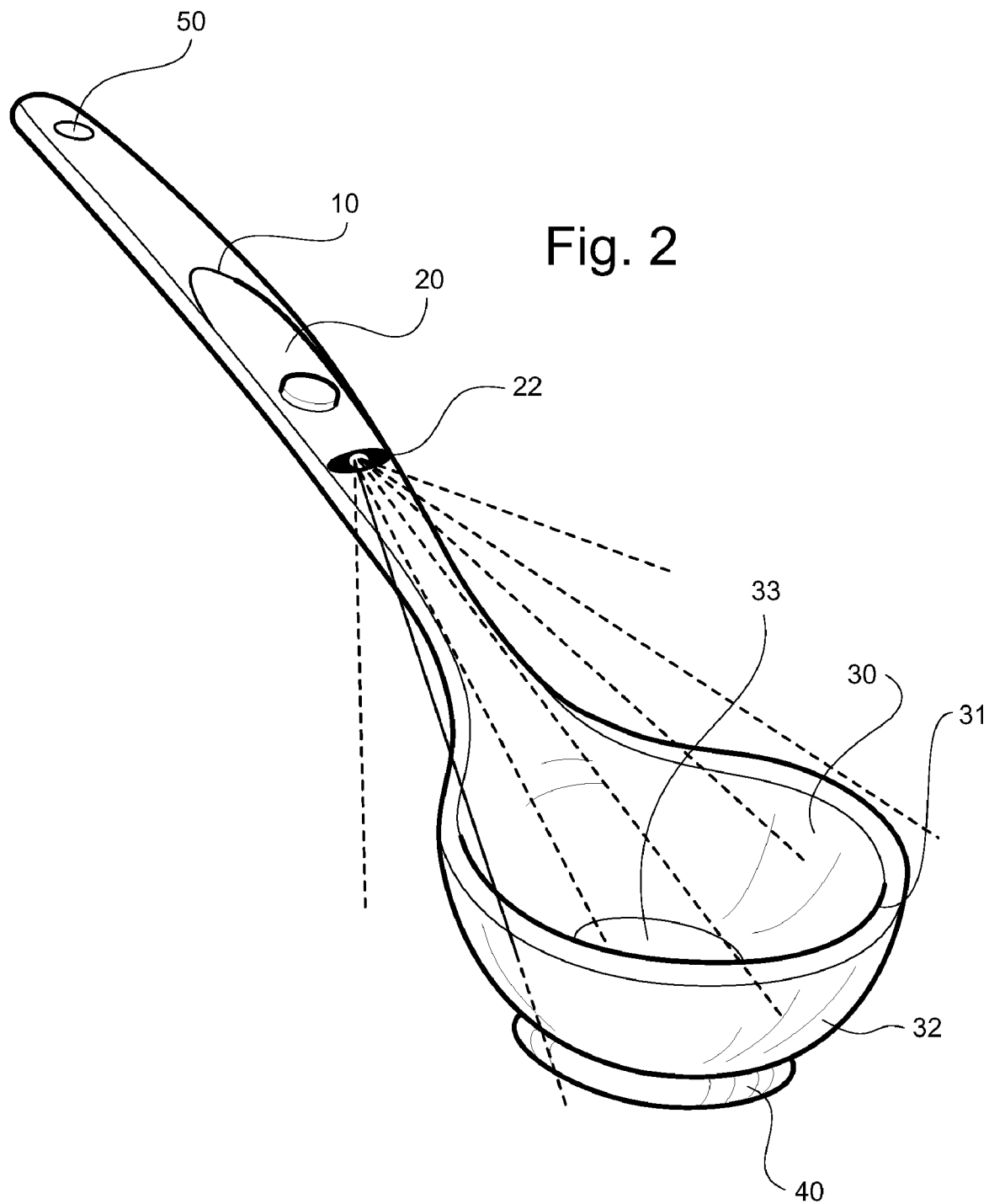
FIG. 2 is a perspective view highlighting the illumination features of the device.
Figure 3:
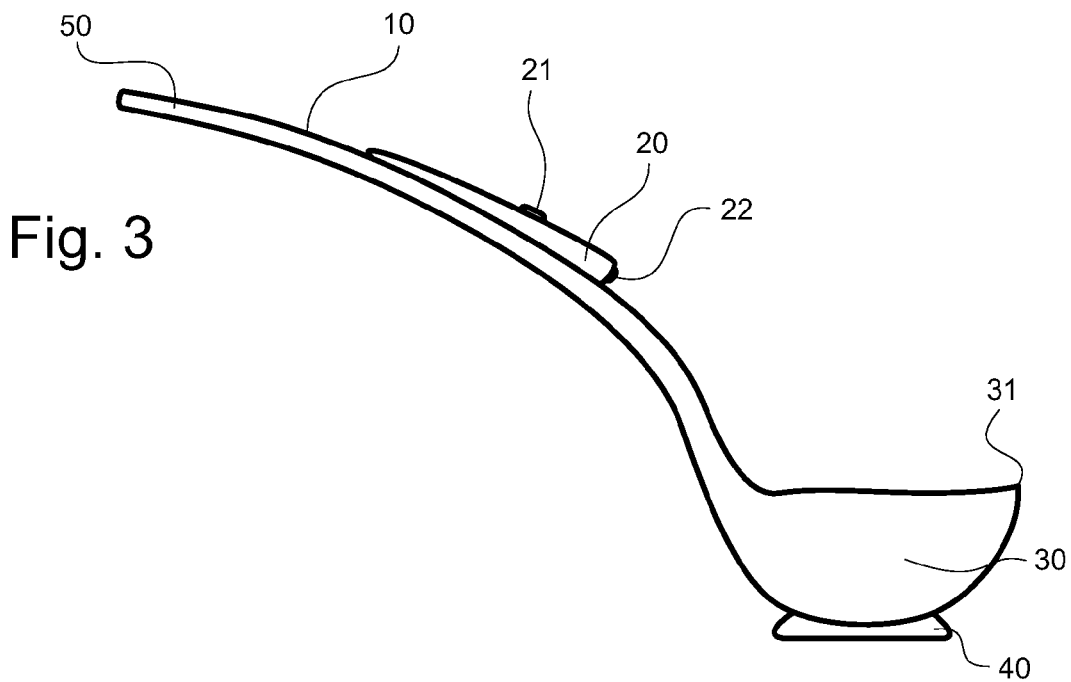
FIG. 3 is a side view of the device.
Figure 4:
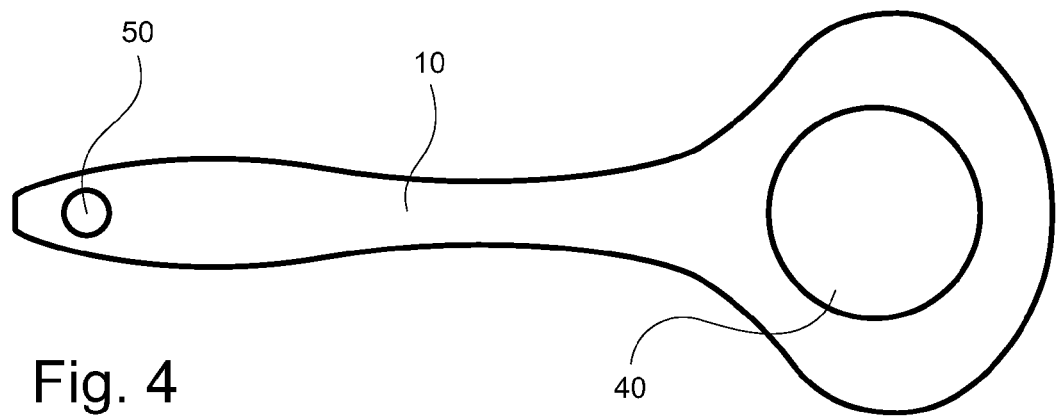
FIG. 4 is a bottom view of the device.
Figure 5:
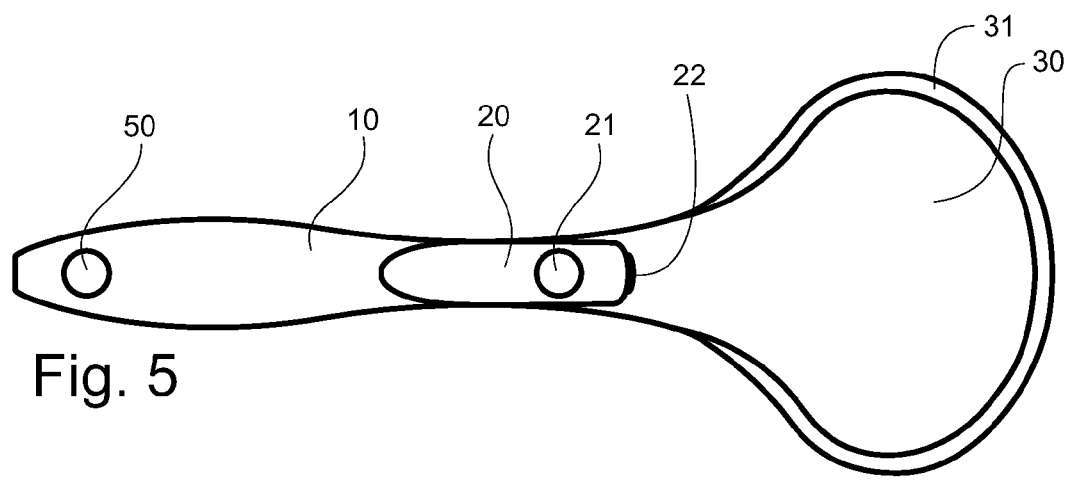
FIG. 5 is a top view of the device.
Figure 6:
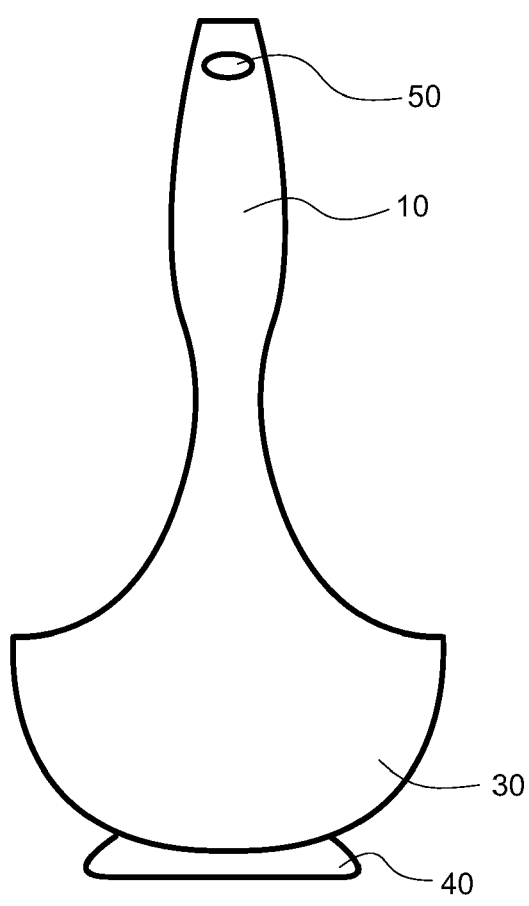
FIG. 6 is rear view of the device.
Figure 7:
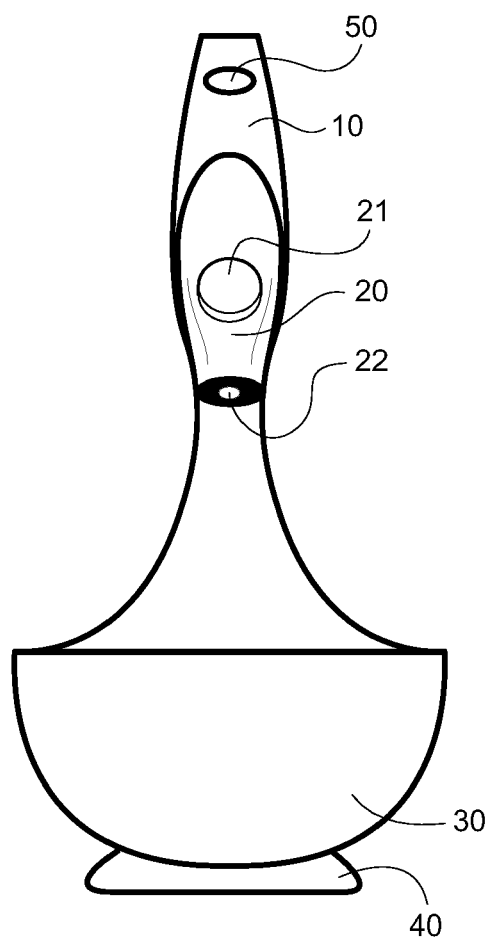
FIG. 7 is a front view of the device.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

The present invention is primarily designed as a tool to be used in the collection of urine specimens from animals (60) for immediate testing. In the preferred embodiment, there is an elongated handle (10), a directed illumination spot lamp (20), a collection pod (30), a level base (40), and a storage loop (50).

The elongated handle (10) is the principal element by which the user (70) grasps the device. It is ergonomically designed to comfortably accommodate the human hand (70). The elongated handle (10) is also the mechanism by which the collection pod is thrust beneath the animal (60) in the collection process. Additionally, the length of the elongated handle (10) will vary depending on the size of the animal (60) to be tested and user preference.

At one end of the elongated handle (10), there is disposed thereon the storage loop (50). In the preferred embodiment, the storage loop (50) is a hole in the handle (10) which facilitates the hanging of the device when no longer in use. The size of the storage loop (50) is moderated to fit standard hooks.

Integral to the elongate handled (10) is the directed illumination spot lamp (20). The directed illumination spot lamp (20), in the preferred embodiment, is fully contained within the housing of the elongated handle (10) and is sealed to prevent water or other contaminant from damaging the components. The directed illuminated spot lamp (20) further comprises a light source (22), an actuation switch (21), and a power source.

The light source (22) is preferably a light emitting diode (LED) though it could also be other light sources such as an incandescent bulb. The light source (22) is positioned to protrude just above the plane of the elongated handle (10) to project a circular spot of light roughly parallel to the elongated handle (10). The projection of the light source falls on an area several times larger than the area of the collection pod (30). In one embodiment, the color of the light emitting from the light source (22) may be white to provide illumination under ordinary conditions. In another embodiment, the light source (22) emits a red light which may be beneficial in other conditions.

The light source (22) is connected to a power supply. Preferably, the power source is a battery. This battery could be a common disposable battery or, preferably, a rechargeable battery.

The actuation switch (21) operates the directed illumination spot lamp (20) which operates from an off position to an on position. In the off position, the lamp does not shine while in the on position the lamp does shine and provides illumination. In the preferred embodiment, the actuation switch (21) is a depressible button. The operator places the lamp (20) in the on position when the button of the actuation switch (21) is depressed and released and the lamp continues to be in the on position until the button is depressed and released by the operator (70) a second time. Having the light on after collection facilitates immediate testing since this could be in a low light situation.

The collection pod (30) is fixedly attached to the elongated handled (10) at the other end of the elongated handle (10), that is, the opposite end from the storage loop (50). The collection pod (30) is characterized by its top rim (31), side walls (32), and bottom pan (33). The top rim (31) is the leading edge of the side walls (32) and is circular, flat, and generally defined in a single plane. The side walls (32) extend downward from the top rim (31) in a generally hemispherical geometry to join with the bottom pan (33). The bottom pan (33), in the preferred embodiment, is a bowl shape that continues sloping in the direction of the side walls (32) to form a small concave collection point at the lowest portion of the pod for collection of the urine specimen.

Fixedly attached to the lower surface of the bottom pan (33) of the collection pod (30) is the level base (40). The level base (40) is circular in shape to act as a base for the collection device to rest on when it contains a sample and is not being held by the user. The level base (40) has a flat and level lower surface defined in a single plane and extends below the lowest projection of the collection pod (30).

What is claimed is:

1. An animal urine specimen collector comprising:

an elongated handle;

a storage loop fixedly attached to said elongated handle;

a plastic collection pod fixedly attached to said elongated handle wherein said collection pod comprises an uncovered opening such that the collection pod is fixedly and permanently open to the environment surrounding the animal urine specimen collector and wherein said collection pod further comprises a top rim disposed at the top of the collection pod, a circular side wall sloping downward from the top rim in a generally hemispherical geometry, and a bottom pan that continues sloping from the circular side wall to form a concave collection point at the lowest portion of the collection pod;

a directed illumination spot lamp protruding just above the plane of the elongated handle, fixedly attached to said elongated handle, and further comprising a red color light source projecting a red color circular spot several times larger than the diameter of the top rim of said collection pod, a battery, and an actuation switch operating from an off position where no light is emitted to an on position where light is emitted; and a level base fixedly attached to said collection pod that is circular in shape and has a flat and level lower surface defined in a single plane located below the lowest projection of said collection pod.

2. An animal urine specimen collector comprising:

an elongated handle;

a storage loop fixedly attached to said elongated handle;

a metal collection pod fixedly attached to said elongated handle wherein said collection pod comprises an uncovered opening such that the collection pod is fixedly and permanently open to the environment surrounding the animal urine specimen collector and wherein said collection pod further comprises a top rim disposed at the top of the collection pod, a circular side wall sloping downward from the top rim in a generally hemispherical geometry, and a bottom pan that continues sloping from the circular side wall to form a concave collection point at the lowest portion of the collection pod;

a directed illumination spot lamp protruding just above the plane of the elongated handle, fixedly attached to said elongated handle, and further comprising a red color light source projecting a red color circular spot several times larger than the diameter of the top rim of said collection pod, a rechargeable battery, and an actuation switch operating from an off position where no light is emitted to an on position where light is emitted; and a level base fixedly attached to said collection pod that is circular in shape and has a flat and level lower surface defined in a single plane located below the lowest projection of said collection pod.

* * * * *